Aug. 15, 1939     E. D. TUBBS     2,169,824
ART OF REMOVING BURRS FROM WELDED ROD LENGTHS
Filed July 22, 1937
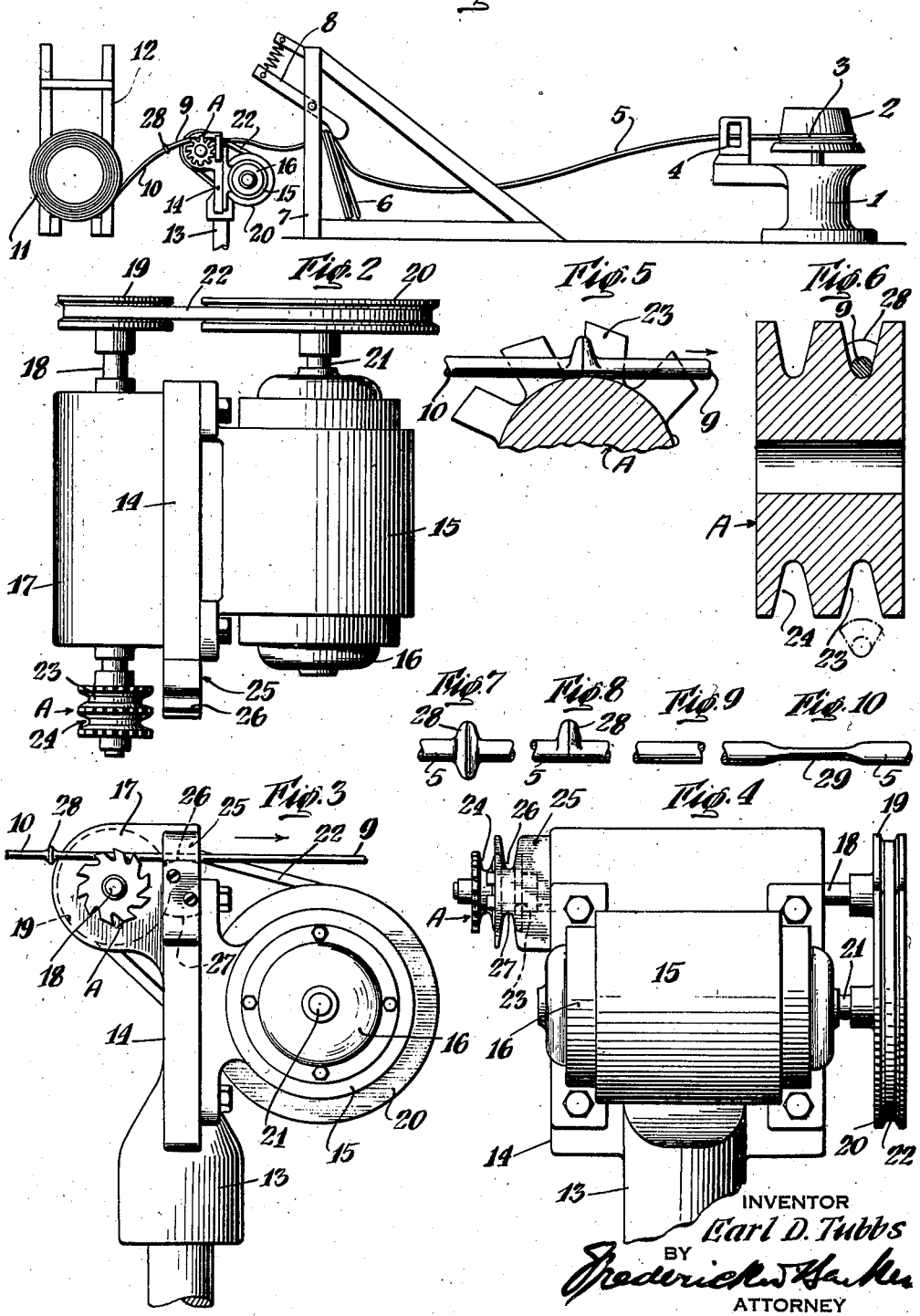

Patented Aug. 15, 1939

2,169,824

UNITED STATES PATENT OFFICE 2,169,824

ART OF REMOVING BURRS FROM WELDED ROD LENGTHS

Earl D. Tubbs, New York, N. Y., assignor to Igoe Brothers, Inc., Newark, N. J.

Application July 22, 1937, Serial No. 155,097

1 Claim. (Cl. 29—148)

This invention relates to the art of joint-welding metallic rod or wire lengths, performed as a step in the process of reducing the rod diameter by a die in a wire drawing system, and my improvement is directed particularly to the provision of weld-burr removing means, arranged conveniently between separate rod lengths or coils, in advance of the point where juxtaposed rod ends are to be welded together.

Such burr removing means comprises a cutter, power driven at such high speed that an operative, holding the welded rods, may bring the burr against the cutter to cause its removal.

In this art of wire drawing much time is lost under the present practice of reducing the diameter of each succeeding length of rod, at an end portion thereof, in order to thread it through the die, and in the threading operation; whereas, with welded together rod lengths the drawing operation may be continuous, because the welding and burr removing operations can be performed for uniting succeeding rod lengths while the rod of one coil is being drawn.

Other features and advantages of my invention will hereinafter appear.

In the drawing:

Figure 1 is a diagrammatic view of a wire drawing system embodying the features of my invention, these features including a standard on which are mounted a motor and a burr removing cutter, with means for driving said cutter from said motor at high speed.

Fig. 2 is a top plan view, enlarged, of the burr removing assemblage.

Fig. 3 is a side elevation of Fig. 2.

Fig. 4 is a front view of Fig. 2.

Fig. 5 is a partial, side sectional view of the cutter.

Fig. 6 is a front sectional view of the cutter, showing a partially removed weld thereon at the top, and the weld about to be applied to the cutter, at the bottom, for complete removal.

Figs. 7, 8, 9 and 10 respectively show the welded rod with the full burr (7), the burr partly removed (8), the burr fully removed (9), and the rod countersunk at its weld (10).

In the wire drawing system illustrated let 1 indicate a support that carries a revoluble receiving drum 2 for reduced wire 3 that has been drawn through a die 4 from the thicker wire or rod 5.

The rod 5 is shown as emanating from a coil 6 which is supported in a frame 7, successive members of the coil being released by a spring held flipper 8 as the rod is drawn through the die.

Before the coil 6 is all used its end 9 is to be united with the end 10 of a reserve coil 11 that is supported in a frame 12 behind frame 7.

The frames 7 and 12 are spaced apart and between them is positioned the assemblage or unit group comprising my burr removing means.

Thus a standard 13 is provided which carries a plate 14 to which is bolted the frame 15 of a motor 16. Also carried by plate 14, at its other side, is a bearing member 17 in which is journalled a shaft 18 that carries, at one end, a pulley 19, and at its other end a cutter which is generally indicated by the reference character A.

Pulley 19 connects with a pulley 20 on the motor shaft 21 as by a belt 22, and because pulley 19 is of much smaller diameter than pulley 20 it will be perceived that shaft 18 with cutter A can be rotated at very high speed. In practice I find it desirable to accord shaft 18 a speed of 3,600 R. P. M. The reason for employing this high speed of rotation will appear hereinafter.

In the unit group referred to the cutter A is shown as provided with two, adjacent, circular rows of concave cutting teeth, indicated respectively at 23, 24; the cutter 23, for example, being employed to remove the burr from the joint-weld, and the cutter 24, for example, being employed to finish the cut surface.

Extended from plate 14 is a guide member 25, having the depressions 26, 27 respectively in line with the concave teeth above and below the cutter axis, said depressions serving as guide rests for the rod that is being passed over and under the cutter in the burr removing operations. For, in practice, when the rod ends, having been welded, forming the burr 28, an operative will grasp the rod with both hands—one at each side of the cutter—drawing the rod in the direction of the arrow, Fig. 3, so that the cutter teeth, at the high R. P. M. rate indicated, will cut off that portion of the burr engaged by the cutter, whereas, at a relatively slow R. P. M. rate the shock of cutter impact against the burr would tear the rod out of the operative's grasp.

In Fig. 8 the rod is shown with the burr of Fig. 7 partially removed, the rod having been placed first in the top part of the cutter, see Figs. 5 and 6, and in Fig. 9 the remainder of the burr has been removed by placing the rod in the bottom part of the cutter, see the bottom part of Fig. 6.

Were the rod to be left with its weld-joint flush with the normal diameter of the rod, as appears in Fig. 9, the rod at this juncture would present too great surface hardness for passage through the die, and, in consequence, I cause the cutting operation to be continued in order to reduce the diameter of the rod, as for example appears at 29, where the softer core portion of the rod is exposed, whereupon the wire drawing operation may be resumed.

Variations within the spirit and scope of my invention are equally comprehended by the foregoing disclosure.

I claim:

The new art of joint-welding metallic rod for continuous diameter reduction which consists in welding juxtaposed rod length ends, thereby creating a circumferential burr, applying said burr to a cutter rotating at high speed for its removal, and continuing the cutting operation to further reduce the jointed rod portion below its normal diameter.

EARL D. TUBBS.